United States Patent [19]
Stone

[11] Patent Number: 4,545,129
[45] Date of Patent: Oct. 8, 1985

[54] MULTIPOSITION LEVEL

[76] Inventor: Theodore M. Stone, P.O. Box 5215, Bakersfield, Calif. 93388

[21] Appl. No.: 563,178

[22] Filed: Dec. 19, 1983

[51] Int. Cl.$^4$ .............................................. G01C 9/24
[52] U.S. Cl. ........................................ 33/390; 33/382
[58] Field of Search ................... 33/381, 390, 382, 256

[56] References Cited

U.S. PATENT DOCUMENTS

| | | | |
|---|---|---|---|
| 1,917,645 | 7/1933 | Hale et al. | 33/256 |
| 3,603,000 | 9/1971 | Ostrager | 33/382 |

FOREIGN PATENT DOCUMENTS

| | | | |
|---|---|---|---|
| 2027095 | 12/1971 | Fed. Rep. of Germany | 33/390 |
| 1192818 | 4/1959 | France | 33/390 |

Primary Examiner—Robert I. Smith
Attorney, Agent, or Firm—Harvey B. Jacobson

[57] ABSTRACT

An elongated hollow body of transparent material is provided and defines a closed cavity therein including a first elongated portion extending transversely of one end of the body, a second elongated portion disposed adjacent and at a 45° angle relative to the other end of the body and a third elongated portion extending along the body and communicating corresponding ends of the first and second cavity portions. A quantity of liquid and a gas bubble fill the cavity and the cavity walls include first, second and third partial cylindrical wall portions spaced closely inwardly of first and second end surfaces and a longitudinal side surface of the body. The first and second end surfaces are disposed at 90° and 45° relative to the longitudinal side surface of the body and each of the surfaces includes indicia thereon defining the central area of the corresponding cavity wall portion in which the bubble may be seated. The body includes additional longitudinal side surfaces and corresponding cavity wall portions registered therewith of varying sizes in which the bubble may be seated.

6 Claims, 5 Drawing Figures

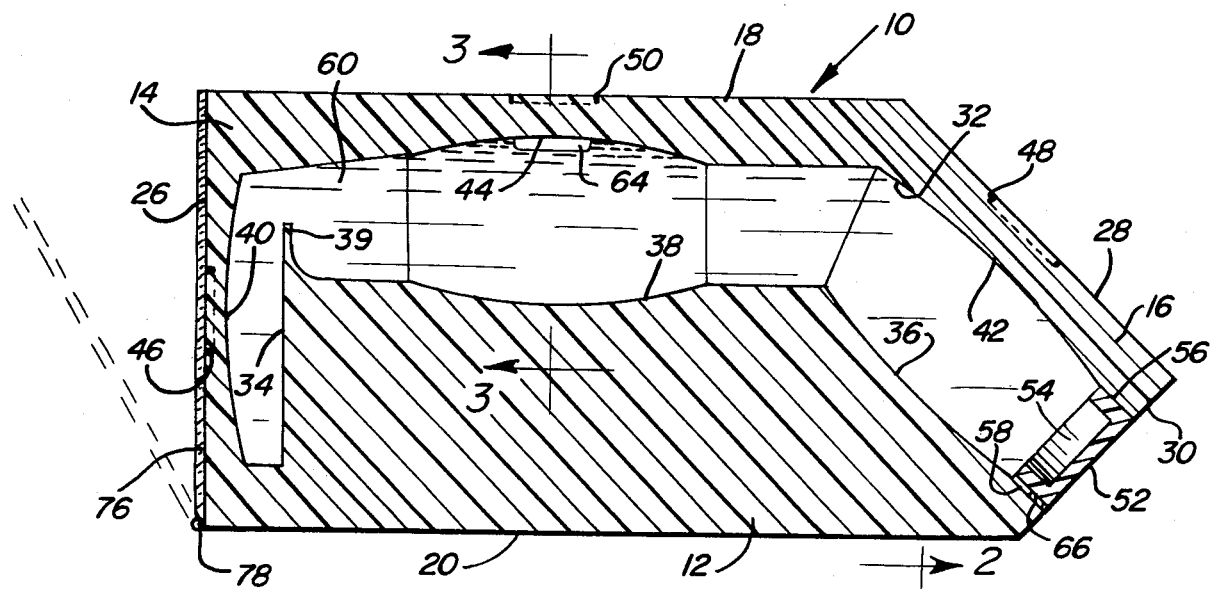
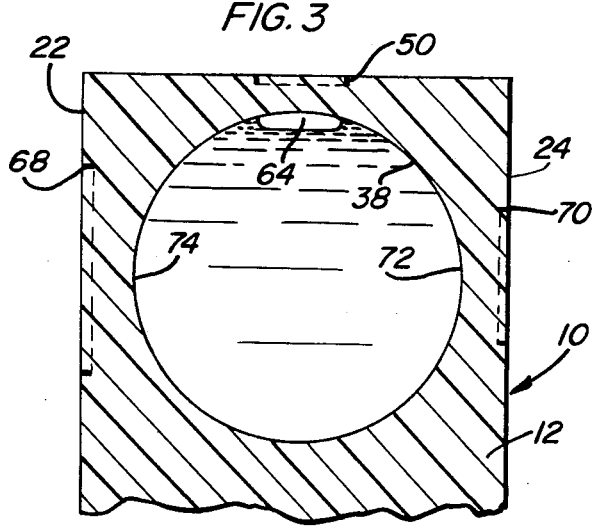
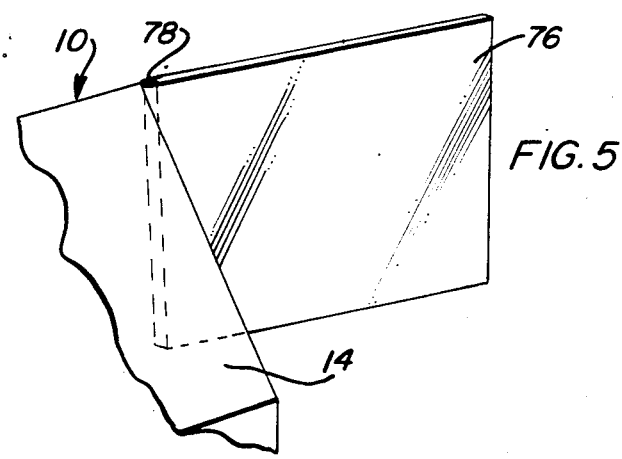
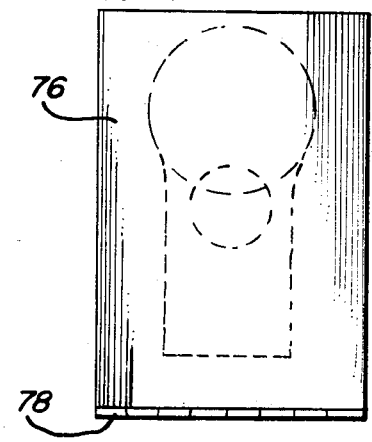

MULTIPOSITION LEVEL

BACKGROUND OF THE INVENTION

Many different forms of levels heretofore have been provided for enabling persons to determine when a surface is horizontal, vertical or at a 45° incline relative to the vertical. Most of these previously known forms of levels include variously relatively positioned individual spirit vials and each of these spirit vials must be mounted relative to a given supportive body in a precise manner. Further, when a level is provided with a plurality of individual specifically positioned spirit vials it is possible that one or more of the spirit vials may shift relative to the supportive body and thereby require that the vials be re-calibrated.

Accordingly, a need exists for a level body including a single bubble cavity therein which may be used to indicate horizontal, vertical and inclined reference planes. By providing a level body having a single cavity therein re-calibration of various spirit vials is avoided.

Various different forms of levels including some of the general structural and operational features of the instant invention are disclosed in U.S. Pat. Nos. 140,055, 401,483, 423,484, 621,358, 624,577, 653,446, 1,108,134, 1,958,314, 2,566,542, 2,791,036, 2,906,031, 2,948,067, 3,435,533, 3,583,073, 3,747,221 and 3,793,735.

BRIEF DESCRIPTION OF THE INVENTION

The single disclosed form of multiposition level of the instant invention incorporates an elongated body having a single liquid and bubble cavity defined therein and the single bubble cavity includes first and second partial cylindrical wall portions spaced immediately inward of first and second end surfaces of the body and at least one additional partial cylindrical wall portion disposed closely inwardly of one longitudinal surface of the body. The cavity has a quantity of liquid and a gas bubble, disposed therein and the gas bubble is registrable with and seatable in the partial cylindrical wall portions of the cavity disposed inwardly of the end surfaces of the body and the aforementioned longitudinal surface of the body. The aforementioned surfaces each include indicia thereon for indicating a centered position of the bubble in the corresponding partial cylindrical wall portion. One end surface of the body is disposed normal to the aforementioned longitudinal surface of the other end surface is disposed at 45° relative to the aforementioned longitudinal surface.

The main object of this invention is to provide a multiposition level incorporating a single liquid and bubble cavity defining a plurality of wall portions against which the bubble may be seated and centered in order to indicate various vertical, horizontal and inclined positions of the level.

Another object of this invention is to provide a multiposition level constructed in a manner whereby the various bubble position areas thereof are fixed relative to each other in order to eliminate the necessity of recalibrating various portions of the level.

Yet another object of this invention is to provide a level in the form of a body of transparent material and defining a single liquid and bubble cavity therein with various wall portions of the cavity establishing bubble centering positions to establish different vertical, horizontal and inclined positions of the body.

Another object of this invention is to provide a multiposition level in accordance with the immediately preceding object and including a pivoted mirror operatively associated with an end surface of the body registered with a bubble position of the cavity and with the mirror being operative to render a view of the associated end bubble position from the remote end of the body.

A final object of this invention to be specifically enumerated herein is to provide a multiposition level in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an end elevational view of the multiposition level;

FIG. 2 is a longitudinal vertical sectional view of the level taken substantially upon the plane indicated by the section line 2—2 of FIG. 1;

FIG. 3 is an enlarged fragmentary vertical sectional view taken substantially upon the plane indicated by the section line 3—3 of FIG. 2;

FIG. 4 is an end elevational view of the level as seen from the left side of FIG. 2; and FIG. 5 is a fragmentary perspective view illustrating the end of the level shown in FIG. 4 with the attendant plane mirror in an open position.

DETAILED DESCRIPTION OF THE INVENTION

Referring now more specifically to the drawings the numeral 10 generally designates the multiposition level of the instant invention incorporating an elongated body 12 of transparent material. The body 12 includes first and second ends 14 and 16 and parallel top and bottom surfaces 18 and 20 as well as parallel opposite side surfaces 22 and 24 extending between the opposite ends 14 and 16. The surfaces 22 and 24 are disposed normal to the surfaces 18 and 20 and the end 14 includes an end surface 26 disposed normal to the surfaces 18, 20, 22 and 24. In addition, the end 16 includes relatively angulated end surfaces 28 and 30 disposed 90° relative to each other, 90° relative to the surfaces 22 and 24 and 45° relative to the surfaces 18 and 20.

The interior of the body 12 defines a closed cavity 32 including a first end portion 34 paralleling the end surface 26, a second end portion 36 paralleling the surface 28 and a third intermediate portion 38 extending between and communicating corresponding ends of the cavity portions 34 and 36. Further, the body 12 includes a tang 39 projecting into and diminishing the juncture area between portions 34 and 38. By diminishing this juncture area, when the level 10 is turned upside down, the tang 39 acts as a trap for the bubble 64 and prevents the bubble 64 from being lost in the cavity portion 34.

The cavity portion 34 includes an inwardly opening partial spherical wall portion 40 closely inwardly of the end surface 26, the cavity portion 36 includes a partial spherical wall portion 42 closely inwardly of the surface 28 and the cavity portion 38 includes a partial spherical wall portion 44 closely inwardly of the surface 18, the wall portions 40, 42 and 44 being inwardly concave and having indicia 46, 48 and 50 on the surfaces 26, 28 and 18 registered therewith.

The end of the cavity portion 36 remote from the cavity portion 38 opens outwardly through the end face 30 and is removably closed by a plug 52 including an inner cavity 54 therein. The plug 52 is received in a bore 56 opening outwardly of the end surface 30 and including a narrow groove 58 extending the length thereof. A quantity of liquid 60 is disposed within the cavity 32 and that portion of the cavity 32 which is not filled by the liquid 60 is occupied by a gas bubble 64. When the cavity is to be filled, the body 12 is positioned with the end surface 26 lowermost and liquid 60 is poured into the cavity 38 through the bore 56. Then, the plug is introduced into the outer end of the bore 56 as the body is turned to a position with its surface 18 lowermost and the groove 58 disposed at the upper side of the bore 56. The plug is displaced inwardly of the bore 56 to the position thereof illustrated in FIG. 2 and a quantity of gas (air) is trapped within the recess or pocket 54 while excess liquid and air within the cavity 32 is displaced outwardly therefrom through the groove 58. Then, the outer end of the groove 58 is sealed closed with a suitable sealant 66. In this manner, all excess gas (air) and liquid trapped within the cavity 32 at the time the plug 52 is initially introduced into the outer end of the bore 56 is expressed from the cavity 32 through the groove 58, except for that portion of the gas trapped within the cavity or recess 54 defined on the inner end of the plug 52. Of course, once the outer end of the groove 58 has been sealed closed, the cavity 32 is fully closed. The gas bubble 64 may register with either of the wall portions 40, 42 and 44 to indicate vertical, horizontal and 45° inclined surfaces against which the side 20 of the body 12 is engaged and the sides 22 and 24 of the body 12 include additional indicia 68 and 70 registered with inwardly concave partial spherical wall portions 72 and 74 of the cavity portion 38 against which the bubble 64 may be registered when the sides 22 and 24 are disosed on upwardly facing horizontal surfaces.

The end 14 of the body 12 includes a plane mirror 76 hingedly supported therefrom as at 78 and which may be used by the operator of the level 10 to view the end surface 26, the indicia 46 and the location of the bubble 64 when the surface 20 is disposed against a vertical edge and the body 12 is positioned at least slightly above the eye level of the user of the level 10. The hinge construction at 78 may be of a friction type wherein the mirror 76 may be frictionally retained in adjusted angular position relative to the end surface 26.

The cavity wall portions 72 and 74 may be of slightly different curvature than the cavity wall portion 44. The radius of curvature of the wall portion 72 may be slightly greater than the radius of curvature of the wall portion 44 and the radius of curvature of the wall portion 74 may be even greater than the radius of curvature of the wall portion 72. Hence, the circular indicia 50, 70 and 68 are of different diameters with the diameter of the indicia 50 being smaller than the diameters of the indicia 68 and 70 and the diameter of the indicia 68 being greater than the diameters of the indicia 50 and 70.

By selectively using the wall portions 44, 72 and 74 the level 10 may generate various accuracy readings insofar as whether or not the surfaces 20, 22 and 24 are horizontally disposed.

It is also pointed out that the body 12 need not necessarily include the inclined cavity portion 36 but instead could be provided with a transverse cavity portion such as the cavity portion 34. In addition, the wall portions 40, 42, 44, 72 and 74 need not be partial spherical in configuration. Rather, the transverse cross section of the central portion 38 of the cavity 32 could be square, octagonal or substantially circular. In addition, a cavity of cruciform cross section could be used. However, no matter what the cross-sectional shape is of the cavity being used, the wall portions of that cavity immediately inward of outer surfaces of the level body having the bubble centering indicia thereon will be of a shape so that the bubble will be centered relative to a predetermined position thereof in order to indicate either a horizontal, vertical or inclined position of the level.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A multiposition level including an elongated hollow body having a closed cavity defined therein incorporating a first elongated longitudinally extending central cavity portion, a second generally 45° angulated first end cavity portion disposed at one end of said central cavity portion and a third 90° angulated second end cavity portion disposed at the other end of said central cavity portion, said end cavity portions projecting outwardly from the same side of said central cavity portion and including inner end portions opening into the adjacent ends of said central cavity portion, said body being constructed of transparent material, a quantity of liquid disposed in and partially filling said cavity, a gas bubble in said cavity occupying the portion thereof not occupied by said liquid, a first side of said body corresponding to said same side of said cavity including a first plane outer surface, a first end of said body corresponding to said other end of said central cavity portion including a second plane outer surface disposed normal to said first surface, the side of said body opposite from said first outer surface including a third plane outer surface paralleling said first surface and a fourth plane outer surface adjacent said one end of said central cavity portion angularly displaced 45° relative to said third outer surface and paralleling said first end cavity portion, said central, second and third cavity portions including first wall portions against which said bubble is centered when said body is disposed with said first, second and fourth outer surfaces, respectively, horizontally disposed, said first wall portions comprising concave partial spherical wall portions, said second, third and fourth outer surfaces include indicia thereon indicating the centered positions of said bubble against the corresponding first wall portions.

2. The level of claim 1 wherein said body includes remote, parallel, plane fifth and sixth outer surfaces extending longitudinally thereof disposed normal to said first and third outer surfaces, said central cavity portion including second wall portions against which said bubble is centered when said body is disposed with said sixth and fifth surfaces, respectively, horizontal and uppermost.

3. The level of claim 1 wherein said second wall portions are inwardly concave partial spherical wall portions.

4. The level of claim 1 including a plane mirror overlying and opposing said second outer surface and hingedly supported from said body along one marginal edge of said second outer surface.

5. The level of claim 1 wherein the end of said third elongated angulated end portion of said cavity remote from said second elongated cavity portion opens through a corresponding end face of said body, a plug removable closing said opening, said plug including an inwardly opening cavity formed on the inner end thereof, the end of said angulated end portion of said cavity remote from said transverse cavity portion in which said plug is disposed including a longitudinal groove comprising a vent passage past said plug, the outer end of said groove being sealingly closed.

6. The level of claim 1 wherein said body includes an integral tang projecting into and diminishing the juncture area of the interior of said body between said first and third cavity portions, said tank projecting into said juncture area from the portion of said body defining the included angle defined between said first and third cavity portions.

\* \* \* \* \*